United States Patent Office 2,898,379
Patented Aug. 4, 1959

2,898,379

REDUCTION OF COMPOUNDS WITH AMINE BORANES

David L. Chamberlain, Jr., Menlo Park, Calif., and William H. Schechter, Zelienople, Pa., assignors to Callery Chemical Company, Pittsburgh, Pa., a corporation of Pennsylvania No Drawing. Application June 18, 1957
Serial No. 666,464

9 Claims. (Cl. 260—618)

This invention relates to the reduction of compounds containing a reducible functional group, and more particularly to the reduction of compounds having at least one aldehyde, ketone or acid chloride functional group. A variety of ways of reducing, or hydrogenating, such compounds have been long known and extensively used More recently the use for such purposes of aluminohydrides, such as lithium aluminum hydride ($LiAlH_4$), and borohydrides, such as lithium borohydride ($LiBH_4$) and sodium borohydride ($NaBH_4$) has become extensive. Those reducing agents are valuable for various purposes but at the same time they are subject to cerain disadvantages. For instance, lithium aluminum hydride is expensive, it decomposes beginning at about 175° C., which precludes its use for some reductions, and it cannot be used in water or alcohols, with which it reacts vigorously, thus limiting its applicability. Similarly, the borohydrides of lithium and sodium react with water, and in the case of lithium the hydrogen liberated may ignite spontaneously. Lithium brohydride is adequately soluble only in such solvents as ether, liquid ammonia and tetrahydrofuran, and it with sodium borohydride is insoluble in many solvents that would be advantageous for some reductions.

One of the objects of this invention is to provide a method of reducing certain reducible functional organic groups that is not subject to the foregoing disadvantages.

Another object is to provide an organic reduction process that is simple, rapid, effective and readily practiced, and that is practicable in a greater variety of reaction media than reactions accomplished with aluminohydrides and borohydrides.

Still another object is to provide an improved method of reducing aldehyde, ketone and acid chloride functional groups by reaction with an amine-borane.

Other objects will appear from the following specification.

The invention is predicated upon our discovery that certain compounds containing a reducible functional organic group may be reduced easily, in accordance with the foregoing objects, by contacting them with an amine-borane in which at least one B—H bond is present at a temperature such as to cause the desired reduction but sufficiently low to avoid decomposition of the compound being reduced or its reduction product, or products.

A particular advantage of the amine-boranes is that they are soluble in a very wide variety of solvents such, for example, as water, aliphatic and aromatic hydrocarbons, ethers (including polyethers, dioxane and tetrahydrofuran), lower alkylamines, liquid ammonia, alcohols, and chlorinated hydrocarbons. Thus they may be used to carry out organic reductions in solvents with which the aluminohydrides or borohydrides are reactive or in which they do not possess sufficient solubility.

The amine-boranes are, in general, quite stable in a variety of solvents and over a fairly wide range of temperatures. These compounds exhibit unexpectedly powerful reducing properties and are easily handled in a great variety of solvents. A further advantage is that the use of amine-boranes makes it possible to carry out many organic reductions in aqueous solutions.

The following examples are given as illustrative of the method of this invention.

Example 1: Reduction of acetone.—3.0 grams (0.051 mol), a 50 percent stoichiometric excess, of dimethylamine-borane was dissolved in 50 ml. of diethyl ether. 5.8 grams (0.10 mol) of acetone was added, slowly at first. No visible reaction took place so all of the acetone was added with stirring. After one-half hour a reaction began as evidenced by gentile boiling of the solution with an evolution of gas. After two and one-half hours the boiling and evolution of gas were still in progress. Upon completion of gas evolution the reaction mixture was distilled with recovery of three fractions. The first fraction, boiling below 45° C., consisted of a mixture of ether and dimethylamine. The second fraction, in the range from 45° to 80° C., consisted of a mixture of dimethylamine and isopropyl alcohol. The third fraction, boiling from 80° to 90° C., consisted of a similar mixture. The second and third fractions were treated with 3,5-dinitrobenzoyl chloride with production of a derivative which when crystallized from hot water consisted of crystals having a melting point of 118° to 120° C. The melting point of isopropyl 3,5-dinitrobenzoate produced by reaction of 3,5-dinitrobenzoyl chloride and isopropyl alcohol is a crystalline compound melting at 121° to 122° C. No acetone was recovered from any of the distillation fractions. Accordingly, the acetone had been completely reduced to isopropyl alcohol.

Example 2: Reduction of benzaldehyde.—To one gram of benzaldehyde there was added a ten percent stoichiometric excess of dimethylamine-borane. A vigorous reaction took place which required cooling of the reaction body to prevent violent boiling. When the reaction was completed the mixture was diluted with water and extracted with carbon tetrachloride. The extract was dried and treated with 3,5-dinitrobenzoyl chloride with production of a crystalline derivative having a melting point of 108° to 110° C. The reported melting point of benzyl 3,5-dinitrobenzoate is 112° C. It was concluded, therefore, that the product obtained was benzyl alcohol.

Example 3: Reduction of chloral hydrate.—1.56 grams of trimethylamine borane was added to a solution of 8.96 grams of chloral hydrate in 25 ml. of water at room temperature and the mixture heated to 70° C. for approximately three hours. The excess amine-borane was hydrolyzed with dilute aqueous HCl, extracted with diethyl ether, and the ether extract dried and distilled. The fraction boiling at 145 to 150° C. consisted of 6.7 grams of 2,2,2-trichloroethanol (reported boiling point 151° C.) or 83% of theoretical. The product was further identified by preparation of the p-nitrobenzoate derivative which after recrystallization from denatured alcohol and water melted at 71 to 71.2° C., compared to the literature value of 71° C.

Example 4: Reduction of benzoyl chloride.—2.05 grams of trimethyl-amine-borane was added to 4.08 grams of benzoyl chloride and heated to 70° C. for 155 minutes, The reaction mixture was then hydrolyzed with 40 ml. of dilute aqueous $H_2SO_4$ and extracted with absolute ether. The ether extract was washed with 5% NaOH, dried and distilled at 10 to 14 mm. Hg. The fraction boiling at 74 to 81° C. at this pressure was collected and tentatively identified as benzyl alcohol from its boiling point and specific gravity. The identification was confirmed by preparation of the 3,5-dinitrobenzoate and α-naphthylurethane derivatives and comparison of their melting points with values reported in the literature.

Example 5: Reduction of cinnamaldehyde.—0.56 gram of dimethylamine borane was added to 3.4 grams of cinnamaldehyde and 20 ml. of glacial acetic acid at room temperature. After about 20 hours, no aldehyde remained in the reaction mixture. The product was vacuum distilled and the distillate identified as cinnamyl alcohol, indicating that the carbonyl group was selectively reduced in the presence of the carbon-carbon double bond. Further experiments have shown that other functional groups such as the ester, amide, nitrile and nitro groups are similarly essentially unaffected by amine-boranes at the described reaction conditions and thus their presence in the molecule will not interfere with the reduction of the desired group.

That this method is applicable generally to ketones, aldehydes and acid chlorides was demonstrated by a series of experiments using the general procedure outlined above. The following table lists a number of reduction reactions carried out with amine-boranes indicating the percent reduction obtained in each reaction:

| Oxidant | Amine-borane | Solvent | Temp. (° C.) | Time | Percent Reduction |
| --- | --- | --- | --- | --- | --- |
| acetophenone. | trimethylamine-borane. | water | 50 | 150 min. | 39.5 |
| Do | dimethylamine-borane. | benzene | 40 | 150 min. | 64.7 |
| anisaldehyde. | trimethylamine-borane. | none | R.T. | 24 hrs. | 55.8 |
| Do | dimethylamine-borane. | water | 40 | 16 hrs. | 65.0 |
| acetone | pyridine-borane. | do | 35 | 120 min. | 36.5 |
| benzoyl chloride. | dimethylamine-borane. | benzene | 40 | 150 min. | 56.5 |
| 2,5-hexanedione. | trimethylamine-borane. | methanol | R.T. | 20 hrs. | 42.3 |

It is apparent from the foregoing examples that the reaction may be carried out at room temperature or below or that moderate heating may be employed. Higher temperatures may also be used and in some instances are desirable, but in general it is preferred to carry out the reaction at moderate temperatures. This is especially true when using ammonia-boranes, methylamine-borane, or dimethylamine-borane since in those cases excessive temperatures may cause decomposition with resulting incomplete reduction. Ammonia and primary amine-boranes are particularly subject to decomposition and thus are less satisfactory for certain reductions.

Reduction according to this invention may be carried out in a variety of solvents or in the absence of a solvent, without appreciable effect on the reaction. For example, the effect of solvents of widely variant characteristics on the reduction of acetophenone with trimethylamine-borane was shown by a series of experiments, the results of which are set forth below:

| Solvent | Temp. (° C.) | Time (Min.) | Percent Reduction |
| --- | --- | --- | --- |
| None | R.T. | 150 | 41.3 |
| Water | 50 | 150 | 38.6 |
| Methanol | 50 | 150 | 48.7 |
| Benzene | 50 | 150 | 34.0 |
| n-Hexane | 50 | 150 | 31.6 |
| Acetic acid | R.T. | 180 | 45.4 |

In another series of experiments, certain currently well known amine-boranes were evaluated as reducing agents for acetone; the data obtained in this series of experiments are set forth below:

| Amine-borane | Solvent | Temp. (° C.) | Time (Min.) | Percent Reduction |
| --- | --- | --- | --- | --- |
| Dimethylamine-borane | water | 35 | 125 | 74.3 |
| trimethylamine-borane | do | 35 | 120 | 41.0 |
| piperidine-borane | do | 35 | 140 | 75.7 |
| pyridine-borane | do | 35 | 120 | 56.5 |

An amine-borane as herein referred to may be defined as an adduct of ammonia, a primary, secondary, or tertiary amine, and borane, $BH_3$, or an organic derivative of borane; provided, however, that at least one hydrogen is attached to the boron atom of the borane. The amine portion of the adduct may be an aliphatic, aromatic or cyclic amine. In these compounds the nitrogen and boron are linked by coordination involving an electron pair. In addition to the amine-boranes referred to above, other amine-boranes are useful in the practice of this invention including $H_3N{:}BH(CH_3)_2$ (ammonia-dimethylborane), $C_5H_5N{:}BH_2C_2H_5$ (pyridine - ethylborane), $(C_2H_5)_3N{:}BH_2CH_3$ (triethylamine-methylborane), and $C_6H_7N{:}BH_3$ (aniline-borane). It should be noted, however, that the amine-boranes in which the amine is ammonia or a primary amine tend to decompose at relatively low temperatures, and therefore are not adapted for reduction of certain compounds, such as those, for example, which require heating in order to induce reaction. Tertiary amine-boranes are the most stable thermally, and are preferred when the reduction is to be carried out at higher temperatures. However, when a secondary amine-borane is employed, a somewhat faster rate of reduction is generally realized than in a similar reduction with the corresponding tertiary amine-borane. The thermal stability of secondary amine-boranes is such that decomposition may be avoided unless unusually severe conditions are employed.

This application is a continuation-in-part of our copending application, Serial No. 489,786, filed February 21, 1955, now abandoned.

According to the provisions of the patent statutes, we have explained the principle of our invention and have described what we now consider to represent its best embodiments. However, we desire to have it understood that, within the scope of the appended claims, the invention may be practiced otherwise than as specifically described.

We claim:

1. That method of reducing organic functional groups selected from the glass consisting of aldehyde, ketone and acid chloride functional groups which comprises contacting a compound containing at least one organic functional group selected from the said class with an amine-borane in which at least one hydrogen atom is attached to a boron atom, at a temperature sufficient to effect reduction of said functional group but insufficient to cause decomposition of said compound and its reduction product whereby said functional group is reduced, and recovering the reduction product from the mixture.

2. A method according to claim 1 in which said amine-borane is a tertiary amine-borane.

3. A method according to claim 1 in which said amine-borane is a secondary amine-borane.

4. A method according to claim 1 in which said compound contains a ketone group and said amine-borane is selected from the class consisting of dimethylamine-borane and trimethylamine-borane.

5. A method according to claim 1 in which said compound contains an aldehyde group and said amine-borane is selected from the class consisting of dimethylamine-borane and trimethylamine-borane.

6. A method acocrding to claim 1 in which said compound contains an acid chloride group and said amine-borane is selected from the class consisting of dimethylamine-borane and trimethylamine-borane.

7. A method according to claim 1 in which said compound is cinnamaldehyde, said amine-borane is dimethylamine-borane, and said reduction product is cinnamyl alcohol.

8. A method according to claim 1 in which said compound is benzaldehyde, said amine-borane is dimethylamine-borane, and said reduction product is benzyl alcohol.

9. A method according to claim 1 in which said compound is benzoyl chloride, said amine-borane is trimethylamine borane, and said reduction product is benzyl alcohol.

References Cited in the file of this patent

UNITED STATES PATENTS

| | | |
|---|---|---|
| 2,683,721 | Schlesinger et al. | July 13, 1954 |
| 2,738,369 | Banus et al. | Mar. 13, 1956 |

OTHER REFERENCES

Banus et al.: Jour. Amer. Chem. Soc., vol. 74 (1952), pp. 2346–48.